Feb. 21, 1967  J. DE MONTREMY  3,305,295
DEVICES FOR PROJECTING MOVING PICTURES OF THE
ANIMATED CARTOON TYPE
Filed June 30, 1964  2 Sheets-Sheet 1

INVENTOR
JEAN de MONTREMY

BY
ATTORNEY

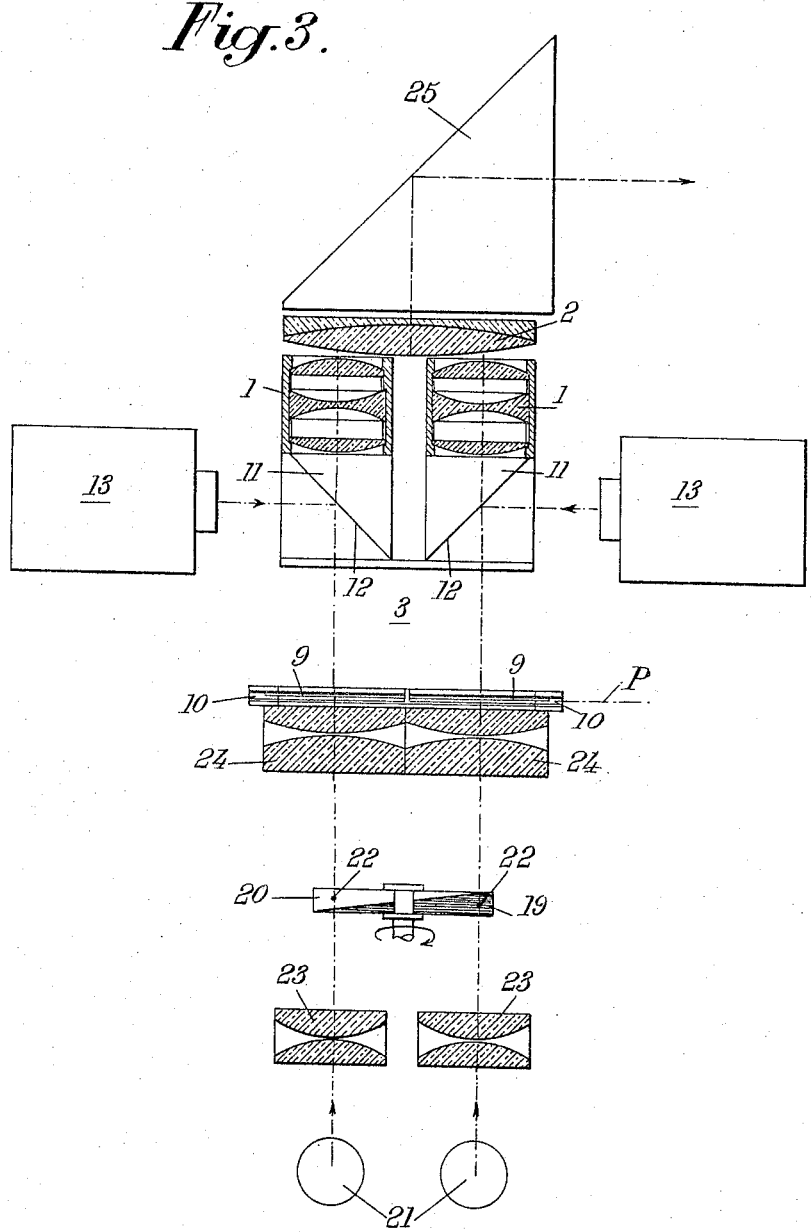

United States Patent Office 3,305,295
Patented Feb. 21, 1967

3,305,295
DEVICES FOR PROJECTING MOVING PICTURES
OF THE ANIMATED CARTOON TYPE
Jean de Montremy, 8 Ave. des Tilleuls, Paris, France
Filed June 30, 1964, Ser. No. 379,178
Claims priority, application France, July 5, 1963,
940,589
5 Claims. (Cl. 352—68)

The present invention relates to devices for projecting animated cartoon by means of a series of pictures carried by one or two continuous films, the even numbered pictures and the odd numbered pictures being projected through two distinct projection channels and every projected picture being gradually replaced by the next one in the series, according to a known principle.

According to this principle, every projected picture is gradually superposed on the preceding one by gradual reduction of the luminous intensity of the first picture and gradual increase of the luminous intensity of the second picture, the illumination of every projected picture becoming minimum and preferably zero at the time where the luminous intensity of the next picture becomes maximum, and every picture of a given order (that is to say either even numbered or odd numbered) being suddenly replaced by the next picture of the same order at the time when its illumination has become minimum.

The device with which the invention is concerned comprises means for successively feeding, in an intermittent manner, every even numbered picture of the series on a first flat area and every odd numbered picture of this series on a second flat area and means for gradually increasing and decreasing the illumination of each of the pictures projected from these areas, the above mentioned means being synchronized together.

According to the present invention the device comprises two identical lenses having parallel optical axes and of relatively small diameters disposed in such manner as to have each as object focal plane one of the above mentioned areas respectively and a lens having its optical axis parallel to the preceding ones and of a diameter sufficiently large for causing the outlines of the two small lenses to be wholly included into that of the big lens, the animated pictures being then formed in the image focal plane of said big lens.

Figure 1:
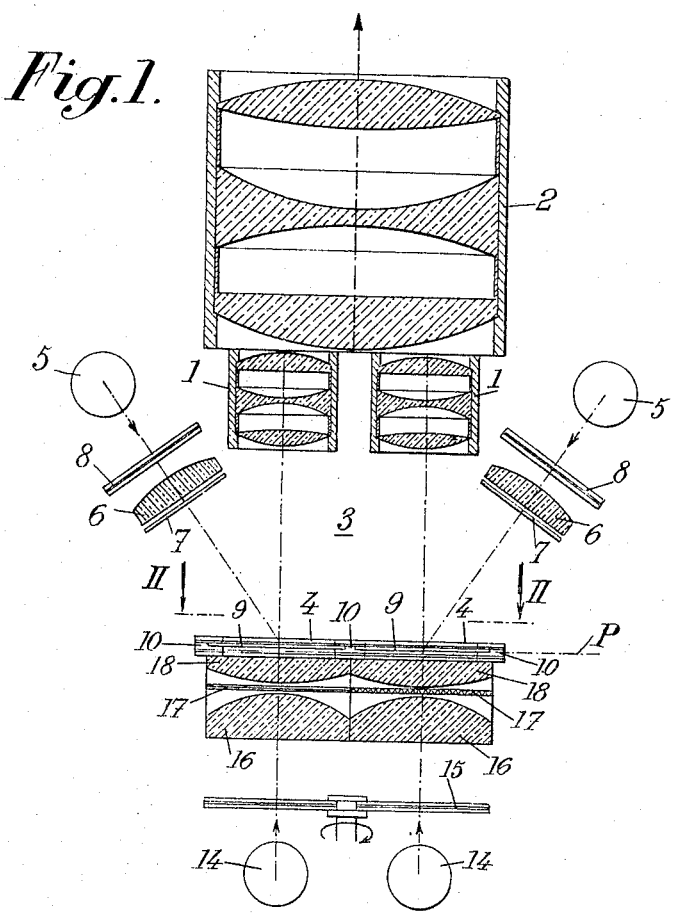

Preferred embodiments of the present invention will be hereinafter described with reference to the appended drawings, given merely by way of example, and in which:

FIG. 1 diagrammatically shows the optical portion of a device for producing animated cartoons, according to the present invention.

Figure 2:
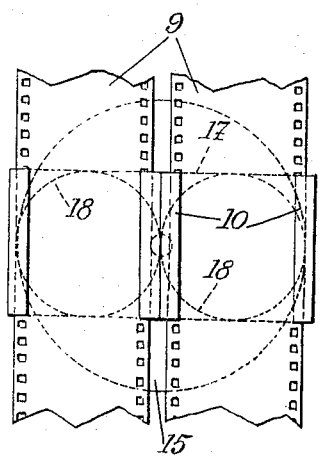

FIG. 2 is a sectional view on the line II—II of FIG. 1.

FIG. 3 diagrammatically shows the optical portion of another device made according to a modification of the invention.

It should first be reminded that, in order to give the illusion of movement, it has already been imagined to project onto a screen two series of fixed pictures, every picture of one series gradually replacing on the screen the preceding picture of the other series, to which it is superposed, by gradually increasing the luminous intensity of said second mentioned picture as the luminosity of the first picture is reduced. When the luminosity of this first picture becomes zero (at a time which corresponds to the maximum luminosity of the second picture) said first picture is automatically replaced by the next picture of its series, which in turn replaces it and so on.

But, up to this time, it has been impossible to provide conditions of projection exactly identical for the pictures of the two series, concerning the incidence angle, the illumination, the sharpness, the dimensions, etc. This produced a visual beat effect which sometimes was very disagreeable.

In order to obviate this drawback, according to the present invention, the two pictures to be projected successively are disposed side by side in the same plane, the corresponding light beams passing respectively through two identical small lenses having their respective optical axes disposed symmetrically with respect to a third axis parallel thereto and the object focal planes of which coincide together, these two small lenses being disposed in front of a big lens, having its optical axis coinciding with said third axis, capable of receiving both of the beams of parallel rays issuing from said small lenses and corresponding respectively to the two pictures to be projected.

If a screen is disposed in the image focal plane of this big lens, both images are projected onto said screen, being centered about the axis thereof in exactly the same conditions, respectively, which eliminates any beat effect for the observer.

The plane in which are located the pictures to be projected is P, the small lenses being shown at 1 and the big lens at 2. This last mentioned lens has been supposed to be anastigmatic in FIG. 1 and achromatic in FIG. 3.

The two small lenses 1 are exactly identical to each other, and preferably of identical focal length. In the drawings they are supposed to be anastigmatic.

The respective optical axes of these two lenses 1 are preferably symmetrical of each other with respect to the optical axis of the big lens, although this is not absolutely necessary.

This arrangement leaves a free space 3 between small lenses 1 and plane P. The existence of this free space may be taken to advantage to form in plane P auxiliary pictures, either fixed or movable, for instance of scenery or the like, illuminated in the same variable manner as the main pictures which they complete, or even to constitute said main pictures by at least partly opaque pictures illuminated by reflection.

Thus, in the device of FIG. 1, scenery elements 4, of cardboard, plastic material, metal or the like, covering only a portion of the scene may be disposed in plane P and illuminated by light beams from sources 5, alternately, said light beams passing through space 3 and transmitted from light sources 5 through condensers 6 and polaroid filters, one 7, stationary, and the other, 8, rotary. The rotation of polarizing filters 8 is adjusted in such manner that the illumination of respective scenery elements 4 is synchronized with the passage of the main features carried by films 9 sliding in their guiding slideways 10. This illumination by reflection may be wholly substituted for the conventional illumination by passage of light through films 9, since, when the elements 4 are only partly opaque, elements 9 can be projected through the non-opaque portions.

In the device of FIG. 3, prisms 11 transparent to light and each having a hypotenuse face 12 which is half metallized (that is to say half-transparent and half-reflecting) are interposed between small lenses 1 and plane P. It is therefore possible, by means of suitable projectors 13, to create in plane P, by reflection on said faces 12 of the prisms, fixed or movable auxiliary pictures which are superposed to those of films 9 and which may even be substituted for them.

In order alternately to increase and decrease the illumination of the pictures of said films 9 it is possible to proceed in any suitable manner, for instance by cooperation of a rotating polarizing filter with a stationary polarizing filter.

This is the case of the diagrammatic embodiment of FIGS. 1 and 2 wherein the light beams from two lamps 14 passing each successively through a rotating polarizing filter 15, a first lens 16 in the object focal plane of which is located the filament of the corresponding lamp 14, a fixed polarizing filter 17 and a second lens 18 capable of forming the image of said filament on the diaphragm of the corresponding small lens 1. The directions of polarization of the two fixed filters 17 are at right angles to each other and the rotation of filter 15 is synchronized with the intermittent and alternate replacement of pictures of films 9 for one another, this replacement being obtained through a conventional mechanism (not shown) including maltese crosses, claws or the like.

According to another embodiment, the gradual and alternating variations of illumination of the pictures are controlled by filtering the beams that illuminate them through a rotating semi-opaque circular wedge, the rotation of said wedge being synchronized with the intermittent shifting of the pictures and having for its effect to modulate the luminous intensity of the fixed beams that pass therethrough in the vicinity of its periphery.

This wedge 19 (FIG. 3), made of a glass called "neutral grey," may be considered as cut in a flat cylindrical disc by a dihedron of small aperture one plane of which is perpendicular to the axis of the cylinder and the ridge of which is tangent to said cylinder.

Advantageously it is completed by another wedge 20 of identical shape and of the same refractory index but transparent to light, juxtaposed axially thereto in opposition therewith so as to form a flat disc therewith. In this way the light rays are not deflected when passing through the rotating system.

In order to obtain a sharp modulation of the illumination, the image of the filaments of the two lamps 21 intended to illuminate the two films 9 is formed at the middle 22 of the thickness of disc 19–20, by means of two identical light condensers 23. Then these images are taken up by means of two other identical condensers 24 juxtaposed against plane P so as to give images thereof on the diaphragms of the two small lenses 1.

Of course, to have the amplitudes of modulation of the two beams identical, and in order that the maximum illumination of one beam may correspond to the minimum illumination or even the total extinguishment of the other beam, the respective axes of these two beams pass through two diametrally opposed points of disc 19–20.

It should be noted that, when such a disc is used, the total luminous intensity of the composite pictures that are projected remains constant since the sum of the thicknesses of the semi-opaque wedge through which the two beams pass, respectively, is constantly equal to the thickness of the flat disc.

In order to avoid deterioration of the rotating filter (15 or 19–20) or to avoid that dust may soil it, thus forming undesirable shadows on the animated drawings, this rotating filter is preferably placed inside a casing (not shown) into which dust cannot penetrate and which contains the whole of the illumination light condensers. This is possible in the embodiments above described due to the fact that said rotating filter is located at the rear of plane P (with respect to the direction of projection of the light beams).

Of course, any arrangements used in optics may be applied to facilitate the utilization of, or to improve the results obtained with, the device above described. In particular there may be disposed at the outlet of the big lens 2, a flat mirror or a reflecting prism 25 (FIG. 3) in order to deflect the direction of projection.

The device above described has in particular the following advantages:

The pictures of the two orders are projected in thoroughly identical conditions of incidence angle, clarity, sharpness, dimensions, and so on, so that beat effects are wholly eliminated;

It is possible to superpose, on the projected pictures, scenery or other elements;

It is possible to utilize either films of pictures transparent to light or opaque bands, which are then illuminated by reflection of the light beam thereon;

Risks of dust depositing on the filters are eliminated;

It is possible to use only one lamp to illuminate both of the bands, since the two lamps shown with reference to the above described embodiments are located side by side and without obstacle between them.

In a general manner, while I have in the above description disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the appended claims.

What I claim is:

1. A device for projecting motion pictures which comprises, in combination, illuminating means, two similar small lenses, arranged side by side and having parallel optical axes in a position to receive light from the illuminating means, in front of which small lenses pictures are adapted to be fed successively and alternately, in the object focal planes of said lenses, respectively, a third lens of at least twice the diameter of said two small lenses on the opposite side thereof from the illuminating means, said third lens having its optical axis parallel to, and located between, the respective optical axes of said two small lenses, whereby the two images from said small lenses are superimposed by said third lens on a screen on the side of the third lens remote from said small lenses, and means between the illuminating means and the small lenses for cyclically gradually increasing and decreasing the intensity of the respective light beams transmitted to the third lens through the two small lenses, so that the intensity of light from one small lens is increased while that from the other is decreased, every picture being changed when the intensity of light from the corresponding small lens passes through a minimum.

2. A device according to claim 1 further including means for projecting auxiliary pictures onto the object focal planes of said small lenses.

3. A device according to claim 1 further including flat opaque objects in the object focal planes of said small lenses, and means for illuminating said objects.

4. A device according to claim 1 wherein said means for cyclically increasing and decreasing the intensity of the respective light beams transmitted to the third lens through the two small lenses comprise two fixed polarizing filters having their directions of polarization at right angles to each other and disposed across said two respective light beams and a corresponding polarizing filter rotatable about the optical axis of the third lens.

5. A device according to claim 1 wherein said means for cyclically increasing and decreasing the intensity of the respective light beams transmitted to the third lens through the two small lenses consist of a disc, wedge-shaped in cross section, and made of a semi-opaque material, rotatable about the optical axis of the third lens, said disc being located in the plane, transverse to said axis, where said light beams are of minimum cross section.

References Cited by the Examiner

UNITED STATES PATENTS

| | | | |
|---|---|---|---|
| 1,714,849 | 5/1929 | Daponte | 352—43 |
| 1,783,399 | 12/1930 | Ames | 352—45 |
| 2,174,931 | 10/1939 | Terry et al. | 88—24 X |
| 2,938,425 | 5/1960 | Lopez-Henriquez | 352—62 |

FOREIGN PATENTS 854,973  11/1960  Great Britain.

JULIA E. COINER, *Primary Examiner.*